May 15, 1962     P. C. WHARFF, JR     3,034,528
SAMPLING VALVE

Filed June 12, 1959     2 Sheets-Sheet 1

INVENTOR.
Prentice C. Wharff, Jr.
BY
Jerome Rudy
ATTORNEY

May 15, 1962  P. C. WHARFF, JR  3,034,528
SAMPLING VALVE

Filed June 12, 1959  2 Sheets-Sheet 2

INVENTOR.
Prentice C. Wharff, Jr.
BY
Jerome Rudy
ATTORNEY

United States Patent Office 3,034,528
Patented May 15, 1962

3,034,528
SAMPLING VALVE
Prentice C. Wharff, Jr., Lafayette, Calif., assignor to The Dow Chemical Company, Midland, Mich., a corporation of Delaware
Filed June 12, 1959, Ser. No. 820,038
5 Claims. (Cl. 137—246.22)

This invention relates to a sampling valve and, more particularly, to a particular variety of rotary selector valve.

Many varieties of selector or sampling valves are known and used for analytical purposes. Such valve apparatus is generally constructed from conventional one-way valves and ordinary fittings. The usual devices are frequently expensive, relatively inconvenient to employ and do not adapt themselves readily to automatic operation.

Rotary selector valves, as known in the art, do not lend themselves conveniently to continuous rotation, despite the fact that this is generally required for truly automatic sampling to be achieved. Known rotary selector valves are quite often unsuitable for utilization in highly corrosive atmospheres and are frequently incapable of providing reliable service.

It would be advantageous if a rotary selector valve were available which would allow the use of a plurality of inflow streams, one of which could be selectively routed to a sample analyzing station while the remainder were being routed to a common discharge port so as to maintain continuous flow in all the streams.

It would be particularly advantageous if such a valve were adapted to be constructed from substantially non-corrosive and non-fouling material.

It would be most advantageous in such a valve if it were possible to completely isolate the stream being sampled from the remainder of the inflow streams to thus eliminate the possibility of commingling of the inflow streams with the stream being sampled.

It would be particularly advantageous if such a valve could be actuated and operated with a minimum of mechanical force.

It would be additionally advantageous if the volume of the sampling chamber in the valve could be held to a minimum for purge purposes.

These and other desired objectives, cognate advantages and benefits are achieved in a valve in accordance with the invention which comprises in combination: a housing having generally frusto-conical interior wall defining a generally frusto-conical cavity, said housing defining a plurality of circumferentially arranged sample ports lying in a plane generally normal to the axis of generation of said frusto-conical cavity and located between the major and the minor diameters of said cavity; a sample discharge port located adjacent to the major diameter of and in communication with said cavity; said housing defining, common discharge port adjacent to the minor diameter of said cavity; a generally frusto-conical rotatable plug adapted to circumferentially mate, in sealing engagement with a portion of the wall of the frusto-conical cavity lying between a plane passing through the sample discharge port and a plane passing through the common discharge port, both of said planes being normal to the axis of generation of said frusto-conical cavity, said plug dividing said frusto-conical cavity into a sample discharge cavity and a common discharge cavity; said plug defining a sample passageway positioned within said plug, said passageway being in communication with said sample discharge cavity, and being alignable by rotation of said plug with any one of said sample ports; a generally circumferential groove located on the frusto-conical surface of said plug, said groove adapted to communicate with all but one of said sample ports, said plug defining a plug discharge passageway providing communication between said groove and said common discharge cavity; rotating means affixed to said plug adjacent to said minor diameter; a pivot bearing positioned at the center of the major diameter of said plug; a flexible diaphragm resiliently tensioned against said pivot bearing, said diaphragm being in circumferential sealing engagement with said housing.

A valve in accordance with the present invention is advantageously adapted to gather and merge the inflows from a plurality of fluid lines and direct them to a common service outlet while simultaneously directing the inflow from an additional line to a separate outlet in such a way that it is segregated from the flow to the common outlet. This, with great expedience and benefit, provides for selective sampling of a fluid from any of the input lines in order to determine the various characteristics thereof as for example, chemical composition, water content (if any), pressure, and the like.

Further features and advantages of the invention will be apparent in the following description and specification, taken in connection with the drawings, wherein.

Figure 1:
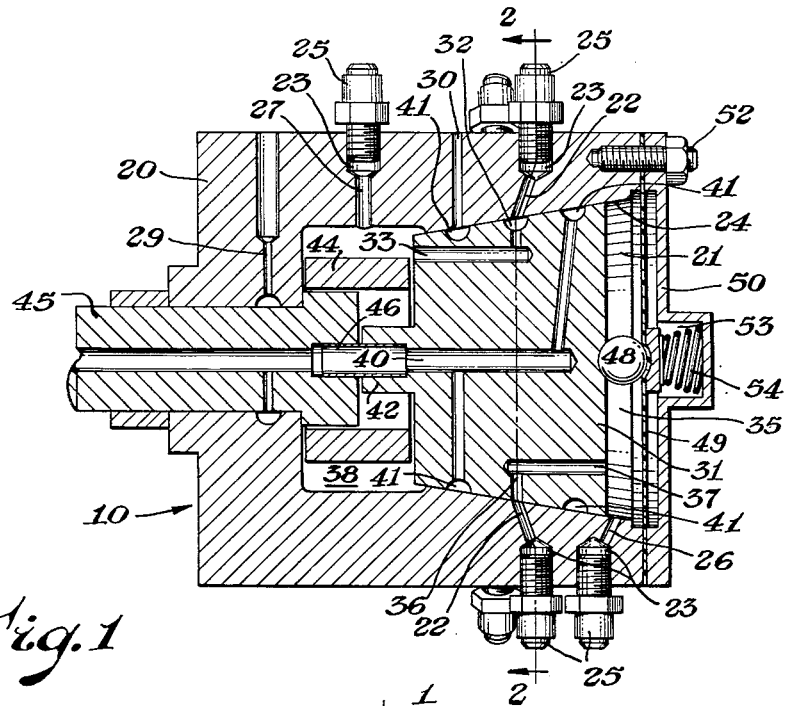
FIGURE 1 is an axial cross-sectional view of a valve in accordance with the invention.

With initial reference in the drawing to FIGURE 1, there is therein illustrated a longitudinal cross-sectional view of a valve, indicated generally by reference number 10, constructed in accordance with the invention. The valve comprises a body or housing 20, defining a generally frusto-conical cavity 21. The walls 24 of cavity 21 include circumferentially arranged sample ports 22 which are in communication with a plurality of axially staggered tubing fitting receptacles 23 and tubing fittings 25, a sample discharge port 26 and a common discharge port 27. Each of the ports 22, 26 and 27 is in communication with a fitting receptacle 23 carrying a tubing fitting 25. A plug lubricant overflow channel 30 and a stem lubricant overflow channel 29 are provided in the housing 20.

A generally frusto-conical plug 31 is positioned within the cavity 21. The plug 31 is in sealing engagement with the interior wall 24 of the housing 20. The plug 31 is provided with a common collector groove 32 which is in communication with a discharge passageway 33. The discharge passageway 33 exits to a common discharge cavity 38. A single sample port 36 within the plug 31 is provided and communicates by means of a passageway 37 with the sample chamber 35. A concentric lubricating chamber or passageway 40 is provided which is in communication with a pair of spaced circumferential lubricant grooves 41 that are generally parallel to the common discharge groove 32. A tang 42 is provided adjacent to the smaller diameter of the frusto-conical plug. The tang 42 is in engagement with a coupling 44 which, in turn, is rotated by a stem 45. A sleeve 46 provides a seal in lubricant channel 40.

A pivot bearing 48 is positioned concentrically with the major diameter of the plug 31. This is held in engagement with the plug 31 by means of a diaphragm 49. The diaphragm 49 is in sealing engagement with the valve body or valve housing 20. A cover 50 is provided to maintain sealing engagement of the diaphragm 49 with the valve body or housing 20. The cover is held in position by means of the studs 52. A centrally located well 53 is provided in the cover 50. Within the well 53 there is located a spring 54 bearing against the diaphragm 49 which, in turn, presses the pivot bearing or sphere 48 into the body of the plug 31. Thus the pressure of spring 54 is transmitted to plug 31 so as to maintain sealing engagement between the frusto-conical plug 31 and the internal surface 24 of housing 20.

Figure 2:
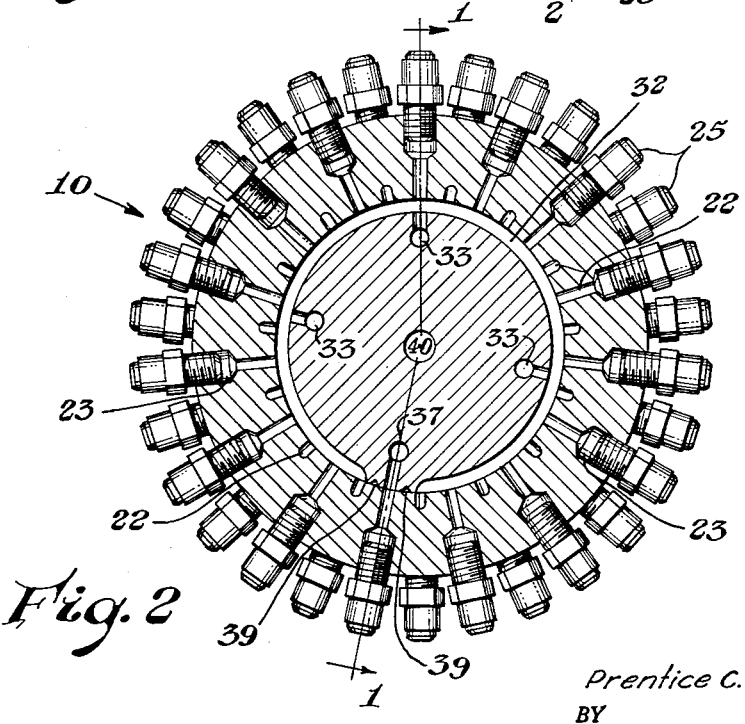
FIGURE 2 is a radial cross-sectional view of the valve illustrated in FIGURE 1.

In FIGURE 2 there is illustrated a cross-sectional view of the valve 10 illustrating the arrangement of the inflow ports 22 and sealing engagement of the frusto-conical surface of the plug 31 with the interior frusto-conical wall of the housing 20. As illustrated, the inflow fitting receptacles 23 have, merely as a matter of convenience, been arranged in two separate levels. Common communication passageways 33 between the common inflow groove or channel 32 and the common discharge cavity 38 are also shown. The lubricant grooves 41 are inter-connected by longitudinal grooves 39.

Figure 3:
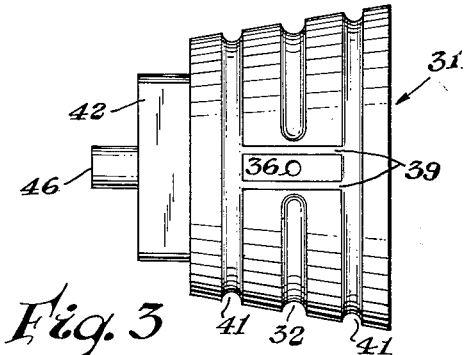
FIGURE 3 is a side view of the frusto-conical plug employed in the valve illustrated in FIGURE 1.

FIGURE 3 shows a side view of the plug 31 illustrating the positioning of the common inflow groove 32, the sampling port 36, and the parallel lubricant grooves 41 which are joined by two generally axially oriented lubricant grooves 39. The tang 42 is shown in which is seated the lubricant sealing sleeve 46.

Figure 4:
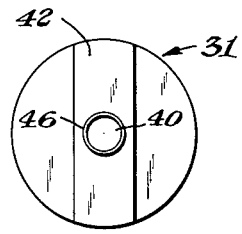
FIGURE 4 is a top view of the tang portion of the frusto-conical plug employed in the valve illustrated in FIGURE 1.

In FIGURE 4, there is delineated a view of the top of the plug 31 shown in FIGURE 3. This depicts the lubricant passageway, the sealing sleeve 46 and the driving tang 42.

Figure 5:
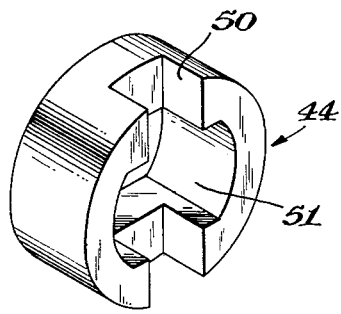
FIGURE 5 illustrates a perspective view of the plug tang engaging coupling.

FIGURE 5 portrays a coupling 44 having a tang engaging groove 50 and a generally rectangular slot 51 adapted to receive the stem 45.

Figure 6:
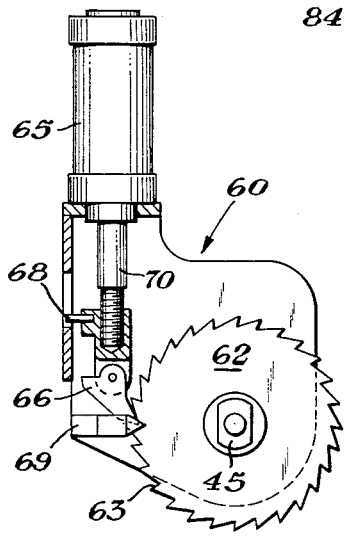
FIGURE 6 illustrates one view of a suitable rotating mechanism which may be employed in cooperation with valves constructed in accordance with the invention.

FIGURE 6 depicts a suitable indexing mechanism, indicated generally by the reference number 60, which may be employed with valves constructed in accordance with the invention. The stem 45 is provided with a ratchet wheel 62 which has number of teeth 63 equal to the number of inflow ports 22. An air cylinder assembly 65 actuates a pawl 66. The pawl 66 may move a distance defined by the internally located mechanical stroke limits of the cylinder (not shown). A pin 68 is provided to prevent rotation of the air cylinder piston rod 70. Reciprocating motion imparted to the pawl 66 by the cylinder assembly 65 gives an intermittent rotary motion to ratchet wheel 62. Thus, with each stroke of the cylinder assembly 15, the plug 31 is rotated through an angle equal to the angular displacement between the ports 22 and the specific port 22 being sampled is indicated by pointer 69.

Figure 7:
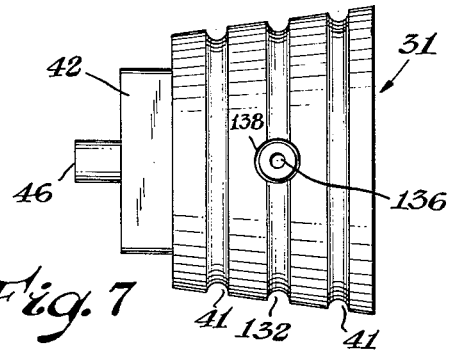
FIGURE 7 illustrates a side view of an alternate embodiment of a plug employed in the valve illustrated in FIGURE 1.

FIGURE 7 illustrates an alternative configuration of grooves which may be employed in the plug of the present invention. A common communication groove 132 is continuous about the circumference of the plug and is joined about the sample port 136 by means of an annular recess 138. This embodiment provides isolation of the sample port 136 from the unsampled ports 22 by diverting any leakage of gases or liquids from the sample port 36 to the common discharge groove 132.

Figures 8, 9:
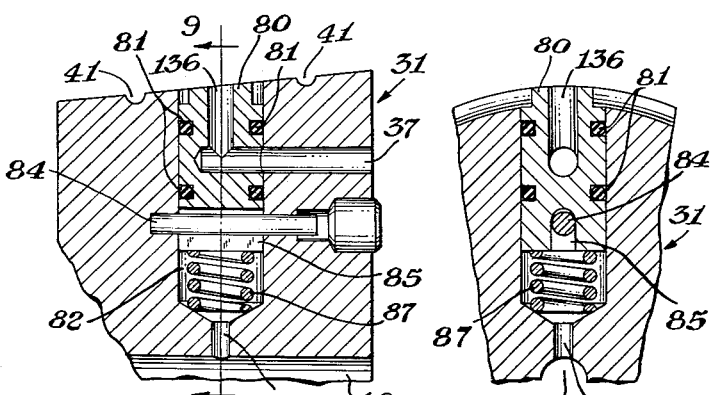
FIGURE 8 illustrates an alternative sealing arrangement for the sample passageway within the plug of the valve.
FIGURE 9 illustrates a top-cross-sectional view of the sealing arrangement illustrated in FIGURE 8.

FIGURE 8 shows an alternate method of sealing which provides a sliding plug 80 within the frusto-conical plug 31 to engage the inner surface or wall 24 of frusto-conical cavity 21 of the valve housing 20. A passageway 136 is provided within the sliding plug 80 which is in communication with a sample port 22 in housing 20 and the sample passageway 37 within the frusto-conical plug 31. In this embodiment of the invention, O rings 81 are advantageously employed to provide a circumferential seal between the plug receiving cavity 82 in the frusto-conical plug 31 and the sliding sample port engaging plug 80. A pin 84 is provided riding in a slot or groove 85 in the sliding plug 80. This prevents rotational misalignment of the sample passageway 136 in the sliding plug 80 and the portion of the sample passageway 37 in the frusto-conical plug 31. A spring 87 is located in the base of the sliding plug receiving cavity 82 to resiliently tension the sliding plug 80 against the wall of the valve housing 21. Advantageously, a passageway 140 is provided which communicates with the coaxial and concentric lubricant channel 40.

FIGURE 9 delineates a top sectional view of the sliding plug arrangement shown in FIGURE 8. In this illustration, the locating pin 84 is located within the groove 85 of the sliding plug 80 and the O rings 81 are shown in engagement with the walls of the sliding plug receiving cavity 82 within the frusto-conical plug 31.

Advantageously, valves made pursuant to the present invention may be constructed from such conventional materials as steel, brass, stainless steel, synthetic resins and the like. Most advantageously, for use with corrosive atmospheres, synthetic resins, such as polytetrafluoroethylene (available commercially as "Teflon"), are employed for the housing 20, plug coupling 44, stem 45 and the diaphragm 49. "Teflon" is particularly advantageous when wet mixtures of hydrogen chloride and chlorine gas are sampled. If the flange 50 is isolated from the material passing through the valve, conventional materials having the required physical properties may be used. Advantageously, "Teflon" or stainless steel pipe or tubing fittings may be employed to join the inflow and outflow conduits to the valve housing 20. The plug pivot means 48 is advantageously constructed from glass, stainless steel, agate synthetic resins such as "Teflon," and similar materials of construction.

In operation, valves in accordance with the invention are assembled substantially as shown in FIGURE 1. A suitable lubricant, if required, is forced under pressure into the lubricating system which comprises channels 40 (alternately 140 if the embodiment of FIGURES 8 and 9 is used), 41, 30 and 39. By rotating the stem and, consequently, the coupling and plug, the plug sample port 36 or 136 is aligned with one of the inflow ports 22. The incoming material is directed into the sample chamber 35 adjacent to the major diameter of the frusto-conical plug 31 and out through the sample discharge port 26. The remaining inflow ports 22 are in communication with the common discharge chamber 38 by means of the groove 32 and the passageways 33 within the plug 31. Thus, the non-sampled ports 22 are directed to the common discharge port 27.

The form of plug 31 illustrated in FIGURES 1, 2 and 3 obtains sealing engagement by means of the mating surface and complete isolation of the sampling port by means of the lubricant grooves 39 and 41. This prevents contamination of the sample stream by material flowing from the non-sampled ports 22 into groove 32. It is usually advantageous to operate with the sample at a higher pressure than the inflow streams or the exhaust port 27 in order to provide a further tendency for the frusto-conical plug 31 to maintain sealing engagement. However, such an arrangement is not essential to the operation of the valve. Ordinarily, adequate tension is provided by the backing spring 54 operating on the diaphragm 49.

Where greater pressures are encountered, it is generally advantageous to employ the seating arrangement illustrated in FIGURES 8 and 9. Thus, by tensioning of the spring 87 backing the plug 80, a suitable sealing force is maintained where high sampling pressure is employed. Pressure on the sealing surface of plug 80 is thus made independent of the force exerted by spring 54 and the pressure on the seal can be increased without increasing the force on the main valve plug. Increasing the tension on spring 54 is not a particularly advantageous method of sealing as greater torque is required to rotate the sampling valve, seating surface wear increases and the like.

The plug arrangement of FIGURES 8 and 9 provides that any leakage of the sampling gas is immediately conducted to the discharge port 27. This prevents any back flow which would contaminate the sampled stream and give rise to erroneous analytical data.

Because of the relatively low internal volume of the valve 10 and the rapid and relatively simple positioning of the plug 31, accurate and representative samples are obtained with pronounced celerity within a minimum period of time.

In a representative application of a valve constructed in accordance with the invention, a unit with thirty inlet ports 22 was provided. Each of the ports 22 was connected to a sample tap on a chlorine cell. The exhaust port 26 was connected to a high vacuum line in the cell gas processing system. The port 27 and chamber 38 were operated under an absolute pressure of about 5 inches of mercury. The suction intake of a positive displacement pump was connected to the sample port 26 by means of a suitable fitting. This pump provided a suction having absolute pressure of about 4 inches of mercury in the sample chamber 35. The effluent from the pump was routed to a conventional gas analyzer, wherein the gas was continuously analyzed for chlorine and hydrogen content. At eight minute intervals, the valve was advanced to the next position by means of an air cylinder assembly, substantially as illustrated in FIGURE 6. The air cylinder was actuated by a solenoid valve which, in turn, was controlled by an electrical timer. Thus, readings of each of the thirty sample taps were taken automatically. Each analysis cycle required eight minutes. Thus, in only four hours, the gas from each cell was analyzed without any necessity of manual operation.

As is apparent, the apparatus is susceptible of being embodied wtih various alterations and modifications from that which has been described in the preceding description and specification. For this reason, it is to be fully understood that all of the foregoing is merely intended to be illustrative and is not to be construed or interpreted as being restrictive or otherwise limiting of the present invention excepting as it is set forth and defined in the appended claims.

What is claimed is:

1. A rotary gathering and sampling selector valve comprising in combination: a housing having frusto-conical interior wall defining a generally frusto-conical cavity, said housing defining a plurality of circumferentially arranged sample ports lying in a plane generally normal to the axis of generation of said frusto-conical cavity in communication with and located between the major and the minor diameters of said cavity, a sample discharge port located adjacent to the major diameter of, and in communication with said cavity, said housing defining a common discharge port adjacent to the minor diameter of said cavity; a generally frusto-conical rotatable plug adapted to circumferentially mate, in sealing engagement, a portion of the wall of the frusto-conical cavity lying between a plane passing through the sample discharge port and a plane passing through the common discharge port, both of said planes being normal to the axis of generation of said frusto-conical cavity, said plug dividing said frusto-conical cavity into a sample discharge cavity and a common discharge cavity; said plug defining a sample passageway within said plug, said passageway being in communication with said sample discharge cavity, and being alignable by rotation of said plug with any one of said sample ports; a generally circumferential groove located on the frusto-conical surface of said plug, said groove adapted to communicate with all but one of said sample ports, said plug defining a plug discharge passageway providing communication between said common discharge cavity and said groove; rotating means affixed to said plug adjacent to said minor diameter; a pivot bearing positioned at the center of the major diameter of said plug; a flexible diaphragm resiliently tensioned against said pivot bearing, said diaphragm being in circumferential sealing engagement wtih said housing.

2. The valve of claim 1 wherein at least two lubricant grooves are provided in the frusto-conical surface of said plug; said lubricant grooves being adjacent and generally parallel to said generally circumferential groove; said plug defining generally radially extending passageways within said plug in communication with said lubricant grooves, a lubricant supply passageway coaxial and concentric with said plug, said lubricant passageway being in communication with said radially extending passageway.

3. The valve of claim 2, wherein two generally axial grooves are provided in said generally frusto-conical surface of said plug said axial grooves being in communication with said circumferential lubricant grooves and positioned adjacent to said sample passageway.

4. The valve of claim 2 wherein a sleeve is provided in said sample passageway in said plug, said sleeve being resiliently tensioned toward said housing wall.

5. The valve of claim 4 wherein an annular recess is provided in said generally frusto-conical surface of said plug, said recess being coaxial with said sleeve and said recess being in communication with said generally circumferential groove.

References Cited in the file of this patent

UNITED STATES PATENTS

| | | |
|---|---|---|
| 346,184 | Wood | July 27, 1886 |
| 825,370 | Zurbuch | July 10, 1906 |
| 1,926,790 | Ploen | Sept. 12, 1933 |
| 2,125,513 | Martin | Aug. 2, 1938 |
| 2,286,689 | Scherer | June 16, 1942 |
| 2,345,073 | Rosett | Mar. 28, 1944 |
| 2,812,753 | Zubaty | Nov. 12, 1957 |
| 2,840,109 | Wadleigh | June 24, 1958 |